United States Patent Office

3,220,892
Patented Nov. 30, 1965

3,220,892
SOLDERING FLUXES
Hobart N. Durham, Jr., New York, N.Y.
(340 Park Ave., Manhasset, N.Y.)
No Drawing. Filed Aug. 12, 1963, Ser. No. 301,589
14 Claims. (Cl. 148—23)

The present invention relates to novel and improved soldering fluxes which are almost completely non-corrosive and are especially adapted for use in the soldering of copper and copper-base alloys, under varying soldering conditions.

Objects and advantages of the invention will be set forth in part hereinafter and in part will be obvious herefrom, or may be learned by practice with the invention, the same being realized and attained by means of the steps, processes and compositions pointed out in the appended claims.

The invention consists in the novel steps, processes, compositions and improvements herein shown and described.

Rosin fluxes of the prior art are well known, but are not commercially satisfactory for many purposes, as they require pre-cleaning of the parts to be soldered, show considerable corrosion in actual use, and require extremely expensive processing to remove the objectionable, relatively conductive flux residues after the soldering operation has been completed.

Other more active fluxes have been known, but exhibit more corrosion than the rosin fluxes, and in many instances require very elaborate cleaning operations to remove the flux residues after the soldering operation has been completed. Among the fluxes of this class are those comprising the hydrazine monohydrohalides.

Fluxes comprising hydrazine and acetic acid, with a slight excess of acetic acid have also been found useful, especially as they require no elaborate cleaning following the soldering operation, but they do normally cause a substantial amount of corrosion, which is not as serious as occurs with many fluxes, but is none the less substantial in many instances and sufficient to prevent the use of such acetic acid-hydrazine fluxes with an excess of acetic acid.

The present invention has for its object the provision of novel and improved soldering fluxes, especially adapted for use with copper and copper alloys, which fluxes cause substantially no corrosion of the copper parts, and leave highly non-conductive flux residues removable by simple washing of the parts in water. Thus, the fluxes of the present invention are advantageous over the rosin fluxes in that they do not require elaborate pre-cleaning or subsequent cleaning of the parts to be soldered. Also, as contrasted with both the rosin fluxes and the other fluxes of the prior art, the fluxes of the present invention cause much less corrosion of the copper. At the same time the fluxes of the present invention generally avoid the necessity of pre-cleaning the parts, excepting work-pieces which are abnormally dirty, and for complete cleaning of the parts after soldering require only simple washing in water. In many instances not even water-washing is required as the fluxes of the present invention are completely volatilized upon the completion of the soldering operation.

Within the series of fluxes of the present invention, there are fluxes which may be used over a wide range of soldering temperatures, and which produce varying degrees of solder flow, some of the fluxes being capable of being volatilized sufficiently so that no subsequent cleaning operation is required, while others require only washing in water, although some of the fluxes if overheated require further treatment to remove the charred flux, an operation which can be avoided by proper manipulation of the fluxes in actual use.

In almost all soldering operations, corrosion is a serious problem, especially in electrical circuits such as those employed in missiles and extremely sensitive radio sets, circuits to be exposed to moist atmosphere over long period of time and other applications having rigorous performance specifications. Where good fluxing and soldering has been consistently achieved, it has usually been due to the proper use of a substantially corrosive acidic flux, followed by elaborate and expensive cleaning procedures which are supposed to remove all corrosive traces of the flux, as well as electrically conductive traces of the flux.

The fluxes of the present invention are primarily distinguished from the fluxes of the prior art in that they contain at least one hydrazine salt selected from the group consisting of the salts of the monobasic, dibasic and tribasic organic acids having a molecular weight of from 60 to 193 and the hydrochloric, hydrobromic and hydriodic acids, have a pH of 7.0 or more up to 10.0, preferably from 7.5 to 8.5, and that they contain an excess of uncombined hydrazine, monomethyl hydrazine or unsymmetrical dimethyl hydrazine. Thus, there is an excess of hydrazine to react with any organic material on the surface of the metal to be soldered. Because the flux is alkaline it has substantially no tendency to react corrosively with the metal surface, while its acidic component is available to react with metal oxides or salts on the surface of the metal. Thus, on clean copper or copper alloy metal, there is no attack or corrosion of the metal, while on dirty or corroded copper, it is only the dirt or corrosion which is attacked, leaving a clean metal surface to be wet and bonded by the solder.

In water solution, paste or slurry, the hydrazine salt or salts and excess hydrazine are used in a minimum concentration of at least 2% by weight, although most of the salts may be used in solutions which are much more concentrated and many of the hydrazine salts may be used in crystalline form, although solutions are more economical in most instances.

The following table shows the weight or volume of acid, volume of hydrazine (shown as 85 weight percent solution of hydrazine hydrate) and water used to form a concentrated flux solution, which may be diluted for use, or may be made up with less water to form a more concentrated flux solution, or in some instances a paste, slurry or crystalline material.

| Example | Acid | Hydrazine hydrate (85%) weight, ml. | Water, ml. |
|---|---|---|---|
| 1. Acetic acid (99.5%) | 15.0 ml | 22.0 | 20.0 |
| 2. Acrylic acid | 18.0 ml | 22.0 | 30.0 |
| 3. Benzoic acid | 30.5 g | 22.0 | 43.2 |
| 4. Butyric acid | 22.0 ml | 22.0 | 30.0 |
| 5. Chloroacetic acid | 23.6 g | 22.0 | 20.0 |
| 6. 2-chloropropionic acid | 21.0 ml | 22.0 | 30.0 |
| 7. 3-chloropropionic acid | 27.1 g | 22.0 | 30.0 |
| 8. Citric acid | 17.5 g | 22.0 | 30.0 |
| 9. Dichloroacetic acid | 20.6 ml | 22.0 | 30.0 |
| 10. Formic acid (90%) | 25.6 ml | 22.0 | 30.0 |
| 11. Glycolic acid (70%) | 27.1 ml | 22.0 | 42.0 |
| 12. Hydriodic acid (57%) | 33.1 ml | 22.0 | 30.0 |
| 13. Hydrobromic acid (47%) | 35.4 ml | 22.0 | 30.0 |
| 14. Hydrochloric acid (38%) | 21.5 ml | 22.0 | 30.0 |
| 15. Lactic acid (85%) | 26.5 ml | 22.0 | 41.0 |
| 16. Malic acid | 16.8 g | 22.0 | 30.0 |
| 17. Malonic acid | 13.0 g | 22.0 | 30.0 |
| 18. Oxalic acid | 15.8 g | 22.0 | 40.0 |
| 19. Propionic acid | 18.5 ml | 22.0 | 30.0 |
| 20. Salicylic acid | 34.6 g | 22.0 | 30.0 |
| 21. Succinic acid | 14.8 g | 22.0 | 30.0 |
| 22. Tartaric acid | 42.0 g | 22.0 | 30.0 |

In the foregoing table, the quantity of water-soluble acid is given in millilitres or grams, as shown. The quantity of hydrazine is expressed as millilitres of 85% hydrazine hydrate, although of course, an equivalent amount of anhydrous hydrazine could be used. In general, the quantity of hydrazine is approximately 1.5 moles for each mole of a monobasic acid, 2.5 moles for each mole of a dibasic acid and 3.5 moles of hydrazine for each mole of a tribasic acid, thus providing an excess of about ½ mole of hydrazine per mole of acid. However, in each instance, the final solution is adjusted by addition of hydrazine or acid so that it has a pH of from 7.0 to 10.0 and most preferably from 7.5 to 8.5.

As stated above, the acids are chosen from those which are water soluble and which form water soluble salts with hydrazine, and are organic acids which have a molecular weight of from 60 to 193, or are hydrohalide acids, i.e. hydrofluoric, hydrochloric, hydrobromic or hydriodic acid. Organic acids of higher molecular weight than 193 form compounds which are not sufficiently water soluble to be suited, while organic acids having molecular weight lower than 60 (e.g. formic acid) form hydrazine salts which are too corrosive with respect to copper to be acceptable in use. Acids such as sulfuric and nitric are especially to be avoided due to their deleterious effect on the fluxing operation.

That portion of the hydrazine which forms the excess in the soldering flux may be replaced with either monomethyl hydrazine or unsymmetrical dimethyl hydrazine, the final solution or flux being adjusted to a pH of from 7.0 to 10.0, preferably 7.5 to 8.5.

The fluxes of Examples 1 to 22 exhibit unusually desirable properties with respect to the corrosion of copper and copper alloys, provide exceptionally low amounts of residue, provide water-soluble residues which are rapidly and completely water-soluble (unless the flux has been heated to an unnecessarily high temperature), provide a variety of flow rates of the solder suiting them to various uses, provide for the control of "bridging" in the soldering of printed circuits and also provide for different operating temperatures.

The following table shows a comparison of the results obtained by using various salts of hydrazine in water solution, all with an excess of hydrazine and all being adjusted to approximately a pH of 7.5. The first column shows the composition of the flux as set forth in the above table, the second column the effect of the flux on a clean copper surface measured over a period of 50 hours immersion in the flux solution, which the next column shows the extent of the solder flow produced by the flux, using a 50/50 solder. The fourth column shows the effect of the flux on the bridging during soldering on a printed circuit board having fine copper lines supported on an epoxy base, the soldering being carried out in a soldering pot. The next or fifth column shows the type of residue which remains on the printed circuit after the fluxed printed circuit has been heated to an extreme temperature of about 700° F., which temperature is often considerably in excess of the soldering temperature. In all instances where char is shown, charring does not occur at lower temperatures, and at the lower temperatures a water soluble residue of the flux remains on the piece undergoing soldering, which residue can generally be removed by simply washing in water. Column 6 shows the general preferred temperature range for best operation of the specific flux, while the final column shows the results of measurement of the resistivity of the flux residue in its dried condition and without having been heated to decomposition temperature, the resistivity being measured in ohms per cubic centimeter of residue.

| Example | Corrosion | Flow | Lack of bridging | Residue at 700° F. | Operating temp. | Resistivity of residue, ohms/cc. |
|---|---|---|---|---|---|---|
| 1 | O | L | P | O | L | 7.7×10⁴ |
| 2 | O | M | G | Char | M | |
| 3 | O | M | P | Char | M | 5.4×10⁴ |
| 4 | O | L | P | O | M | |
| 5 | C | VH | G | Char | H | 1.5×10⁵ |
| 6 | CC | VH | G | LC | H | |
| 7 | O | H | E | LC | H | |
| 8 | O | M | P | Char | M | 6.6×10⁶ |
| 9 | CC | H | P | Char | H | |
| 10 | C | L | P | O | L | |
| 11 | O | M | P | LC | M | |
| 12 | O | VH | P | O | VH | |
| 13 | O | VH | P | O | VH | |
| 14 | O | VH | E | O | VH | 4.6×10³ |
| 15 | O | M | P | LC | M | |
| 16 | O | M | E | Char | M | 4.6×10⁶ |
| 17 | O | M | P | | M | |
| 18 | O | M | P | LC | H | 7.6×10⁶ |
| 19 | O | L | P | O | M | |
| 20 | O | M | P | LC | M | |
| 21 | O | M | G | | M | 1.5×10⁷ |
| 22 | O | M | E | Char | M | |

In the foregoing table the symbols have the following meanings:

Corrosion:

O = Negligible corrosion, less than 4.0 mg./ft.²/50 hours.
C = Measurable corrosion, 4.0 to 120.0 mg./ft.²/50 hours.
CC = Substantial corrosion, over 120 mg./ft.²/50 hours.

These values were measured by immersion of the copper specimen in the sample at room temperature for 50 hours.

Flow: Measured using 50–50 tin-lead solder, 0.1″ diameter 0.25″ long on copper sheet, heated above melting point of solder in flame, and by observation of the spread of the solder on the copper surface, without mechanical action on the solder.

L = Low spread or flow.
M = Medium spread or flow.
H = High spread or flow.
VH = Very high spread or flow.

Lack of Bridging: Standardized copper printed circuit on epoxy base, having conductors spaced about 1 mm. from each other, soldered with 50–50 solder heated to 480° F. in solder pot, 2 seconds immersion of printed circuit, after which printed circuit withdrawn from solder and cooled.

P = Poor. Excessive bridging.
G = Good. Occasional bridging.
E = Excellent. No bridging.

700° Residue: Quality or type of flux residue remaining after heated fluxed copper piece to 700° F.

O = No residue on copper.
T = Trace, water soluble carbonized residue.
LC = Light char. Small amount of carbonized residue.
Char = Substantial quantity of carbonized residue but water soluble if fluxed piece not heated to 700° F.

Operating Temperature:
L=up to 450° F.
M=450° to 550° F.
H=550° to 625° F.
VH=above 625° F.

Resistivity of Residue: Measured in ohms/cc. at ambient temperature after heating to about 350° F.

All of the foregoing fluxes of the present invention are useful for hand soldering with excellent properties, none char at ordinary soldering temperatures and the fluxes of Examples 7, 21 and 22 are preferred for use in soldering pots, those of examples 8, 14, 18, 21 and 22 for wave soldering machines, those of examples 14 and 18 with soldering torches and the flux of example 1 for use with hand soldering irons, all using 50–50 solder on copper.

Other examples of fluxes according to the present invention employing monomethylhydrazine with similar acids and with added hydrazine (or hydrazine hydrate) to adjust the pH to within the range of pH 7.0 to 10.0, preferably ph 7.5 to 8.5.

| Example | Vol. 85% $N_2H_4H_2O$, ml. | Acid weight, gm. | Monomethyl hydrazinic wt. (MMH), gm. | Water |
|---|---|---|---|---|
| 23. Acetic acid | 7.4 | 15.01 | 11.52 | 25 |
| 24. Acrylic acid | 7.4 | 18.01 | 11.52 | 25 |
| 25. Benzoic acid | 2.0 | 7.63 | 2.88 | 30 |
| 26. Butyric acid | 7.4 | 22.02 | 11.52 | 20 |
| 27. Chloroacetic acid | 7.4 | 23.62 | 11.52 | 20 |
| 28. 2-chloropropionic acid | 3.7 | 13.59 | 5.76 | 20 |
| 29. 3-chloropropionic acid | 3.7 | 13.59 | 5.76 | 20 |
| 30. Citric acid | 7.4 | 16.01 | 11.52 | 20 |
| 31. Dichloroacetic acid | 3.7 | 16.12 | 5.76 | 20 |
| 32. Formic acid (90%) | 7.4 | 11.51 | 11.52 | 20 |
| 33. Glycolic acid (70%) | 7.4 | 19.01 | 11.52 | 15 |
| 34. Hydrochloric acid (38%) | 7.4 | [1]25.0 | 11.52 | 20 |
| 35. Lactic acid (85%) | 7.4 | 22.52 | 11.52 | 15 |
| 36. Malic acid | 7.4 | 16.76 | 11.52 | 15 |
| 37. Malonic acid | 7.4 | 13.01 | 11.52 | 15 |
| 38. Oxalic acid | 7.4 | 15.76 | 11.52 | 20 |
| 39. Propionic acid | 7.4 | 18.52 | 11.52 | 20 |
| 40. Salicylic acid | 2.0 | 8.64 | 2.88 | 20 |
| 41. Succinic acid | 7.4 | 14.76 | 11.52 | 25 |
| 42. Tartaric acid | 2.0 | 10.51 | 2.88 | 20 |

[1] Milliliter.

The properties of the fluxes using monomethyl hydrazine (MMH) and hydrazine are similar to those of the corresponding acids used in Examples 1 to 22.

| Example | Acid | Acid wt., g. | Monomethyl hydrazine wt., g. | Water, ml. | pH | E.M.F. |
|---|---|---|---|---|---|---|
| 43 | Acetic | 15.01 | 17.3 | 25 | 8.50 | +0.650 |
| 44 | Citric | 16.01 | 17.3 | 20 | 9.00 | +0.585 |
| 45 | Oxalic | 15.76 | 17.3 | 20 | 8.65 | +0.544 |
| 46 | Tartaric | 10.51 | 5.88 | 20 | 8.20 | +0.514 |

In general monomethylhydrazine may be used in place of hydrazine, and monomethylhydrazine may be used in combination with hydrazine or unsymmetrical dimethylhydrazine so as to bring the solution or slurry to a pH of from 7.0 to 10.0, and more preferably pH 7.5 to 8.5.

| Example | Acid | Acid wt., g. | UDMH wt. | Water, ml. | pH | E.M.F. |
|---|---|---|---|---|---|---|
| 47 | Acetic | 15.01 | 22.6 | 25 | 7.80 | +0.544 |
| 48 | Oxalic | 15.8 | 25.6 | 20 | 7.70 | +0.461 |
| 49 | Succinic | 14.8 | 20.8 | 20 | 8.00 | +0.497 |
| 50 | Tartaric | 9.6 | 22.5 | 20 | 7.10 | +0.455 |
| 51 | Hydrochloric (36%) | [1]13.8 | 9.6 | 100 | 7.40 | +0.461 |

[1] Milliliters.

Similarly, unsymmetrical dimethyl-hydrazine (UDMH) may be used in a principal amount in combination with hydrazine or hydrazine hydrate as illustrated in the following formulae, and with advantageous results as set forth above. Examples of such compositions are shown in the following table, all of which compositions are finally adjusted to have a pH of from 7.0 to 10.0 preferably 7.5 to 8.5 by varying the amount of hydrazine hydrate, UDMH or acid.

| Example | Acid | $N_2H_4H_2O$ (85%), ml. | Acid weight, g. | UDMH wt., g. | Water, g. |
|---|---|---|---|---|---|
| 52 | Acetic | 7.4 | 15.01 | 15.03 | 25 |
| 53 | Acrylic | 7.4 | 18.01 | 15.03 | 20 |
| 54 | Benzoic | 2.0 | 7.63 | 3.76 | 30 |
| 55 | Butyric | 7.4 | 22.02 | 15.03 | 20 |
| 56 | Chloroacetic | 7.4 | 23.62 | 15.03 | 20 |
| 57 | 2-chloropropionic | 3.7 | 13.57 | 7.51 | 20 |
| 58 | 3-chloropropionic | 3.7 | 13.57 | 7.51 | 20 |
| 59 | Citric | 7.4 | 24.01 | 22.50 | 15 |
| 60 | Dichloroacetic | 3.7 | 16.12 | 7.51 | 20 |
| 61 | Formic (90%) | 7.4 | 11.51 | 15.03 | 20 |
| 62 | Glycolic (70%) | 7.4 | 19.01 | 15.03 | 15 |
| 63 | Hydrochloric (38%) | 7.4 | [1]25.00 | 15.03 | 15 |
| 64 | Lactic (85%) | 7.4 | 22.52 | 15.03 | 15 |
| 65 | Malic | 7.4 | 16.76 | 15.03 | 15 |
| 66 | Malonic | 7.4 | 13.01 | 15.03 | 15 |
| 67 | Oxalic | 7.4 | 15.76 | 15.03 | 15 |
| 68 | Propionic | 7.4 | 18.52 | 15.03 | 20 |
| 69 | Salicylic | 2.0 | 8.64 | 3.76 | 30 |
| 70 | Succinic | 7.4 | 14.76 | 15.03 | 20 |
| 71 | Tartaric | 2.0 | 10.51 | 3.76 | 15 |

[1] Milliliters.

The following table shows the amount of corrosion with various fluxes of the present invention, as disclosed above, compared with some fluxes of the prior art.

| Acid | Hydrazine | MMH | U.D.M.H. |
|---|---|---|---|
| Acetic | 0 | 0 | 0 |
| Acrylic | 0 | 0 | 0 |
| Benzoic | 0 | 0 | 0 |
| Butyric | 0 | 0 | 0 |
| Chloroacetic | 1.30 | 4.18 | 0.96 |
| 2-chloropropionic | 5.76 | 1.72 | 1.23 |
| 3-chloropropionic | 0 | 0.13 | 0.14 |
| Citric | 0.14 | 0 | 0.14 |
| Dichloroacetic | 6.72 | 45.5 | 3.74 |
| Glycolic | 0.21 | 0 | 0.37 |
| Hydrochloric | 0 | 0 | 0.37 |
| Lactic | 0 | 0 | 0 |
| Malic | 0 | 0.13 | 0 |
| Malonic | 0 | 0 | 0 |
| Oxalic | 0 | 0.13 | 0 |
| Propionic | 0 | 0 | 0 |
| Salicylic | 0 | 0 | 0.82 |
| Succinic | 0 | 0 | 0.37 |
| Tartaric | 0 | 0 | 0.07 |

In the foregoing table the notation 0 means that the corrosion per square foot of copper surface immersed in the flux for 50 hours at room temperature was less than 0.1 mg. Where a numerical value is given, it is expressed in milligrams of copper corroded per square foot over 50 hours under similar conditions.

Compared with fluxes of the present invention typical commercial fluxes of the present time give the following corrosion rates.

Mg./ft.$^2$/50 hours
Activated rosin in ethanol _____ 2.3
Hydrazine monohydrobromide in water _____ 11.0
Superior 30 _____ 115.0

The invention in its broader aspects is not limited to the specific steps, processes and compositions shown and described but departures may be made therefrom within the scope of the accompanying claims without departing from the principles of the invention and without sacrificing its chief advantages.

What is claimed is:
1. A soldering flux consisting essentially of a water solution of a water-soluble salt of an acid, said acid being selected from the group consisting of the monobasic, dibasic and tribasic organic acids having molecular weights of from 60 to 193 and the hydrohalide acids, and a base having the general formula

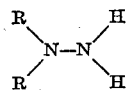

in which R is hydrogen, methyl or ethyl, said solution including an excess of a compound having said formula

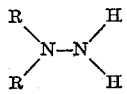

so that the pH of the solution is within the range of 7.0 to 10.0.

2. A soldering flux according to claim 1, said solution having at least 2% by weight of solute.

3. A soldering flux according to claim 1, said solution having an excess of the compound

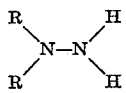

and in which the pH is between 7.5 and 8.5.

4. A soldering flux according to claim 1, said solution having a pH of from 7.5 to 8.5 in a concentration of from 10 to 15% by weight of non-aqueous ingredients.

5. A soldering flux consisting essentially of water and a salt selected from the group consisting of the salts of monobasic, dibasic and tribasic acids having molecular weights of from 60 to 193 and of the hydrohalide acids, and a base consisting of and said solution including an excess of a compound having the formula in which R is hydrogen, methyl, or ethyl, said solution having a pH of from 7.0 to 10.0.

6. A soldering flux according to claim 5 in which the acid is acetic acid.

7. A soldering flux according to claim 5 in which the acid is citric acid.

8. A soldering flux according to claim 5 in which the acid is hydrochloric acid.

9. A soldering flux according to claim 5 in which the acid is oxalic acid.

10. A soldering flux according to claim 5 in which the acid is tartaric acid.

11. A soldering flux according to claim 5 in which said compound is hydrazine.

12. A soldering flux according to claim 5 in which said compound is monomethylhydrazine.

13. A soldering flux according to claim 5 in which said compound is unsymmetrical dimethyl hydrazine.

14. A soldering flux according to claim 5 in which the solution has a pH of between pH 7.5 and 8.5.

References Cited by the Examiner

UNITED STATES PATENTS

| 1,877,867 | 9/1932 | Hey | 148—23 |
| 2,612,459 | 9/1952 | Willard et al. | 148—23 |
| 2,803,572 | 8/1957 | Konig | 148—23 |

DAVID L. RECK, *Primary Examiner.*

WINSTON A. DOUGLAS, *Examiner.*